(12) United States Patent
Lin

(10) Patent No.: US 6,640,442 B2
(45) Date of Patent: Nov. 4, 2003

(54) CUTTING STROKE-ADJUSTABLE PRUNING SHEARS

(76) Inventor: Thomas Lin, No. 21, Wan Feng Lane, Wan Feng Village, Fu Hsing Hsian, Chang Hua Hsien (TW)

(*) Notice: Subject to any disclaimer, the term of this patent is extended or adjusted under 35 U.S.C. 154(b) by 17 days.

(21) Appl. No.: 10/114,121

(22) Filed: Apr. 3, 2002

(65) Prior Publication Data

US 2003/0136008 A1 Jul. 24, 2003

(30) Foreign Application Priority Data

Jan. 22, 2002 (TW) ...................... 91200578 U

(51) Int. Cl.[7] .............................................. B26B 13/00
(52) U.S. Cl. ............................ 30/251; 30/249; 30/250
(58) Field of Search .......................... 30/249, 250, 251, 30/92, 244; 81/314

(56) References Cited

U.S. PATENT DOCUMENTS 5,511,314 A * 4/1996 Huang .......................... 30/251
5,709,030 A * 1/1998 Wang ........................... 30/251
5,761,815 A * 6/1998 Lin .............................. 30/251
5,839,195 A * 11/1998 Lin .............................. 30/250
5,950,314 A * 9/1999 Chang .......................... 30/250

* cited by examiner

*Primary Examiner*—Hwei-Siu Payer
(74) *Attorney, Agent, or Firm*—Browdy and Neimark, P.L.L.C.

(57) ABSTRACT

A cutting stroke-adjustable pruning shears is constructed to include a fixed jaw and a movable jaw pivoted together, the movable jaw having an elongated slot and a plurality of retaining notches in one long side of the elongated slot, a holder shell, the holder shell having two parallel side panels pivoted to a middle part of the fixed jaw at two sides and a spine connected between the parallel side panels, a coupling arm, the coupling arm having one end pivoted to the parallel side panels of the holder shell and an opposite end mounted with a pivot coupled to the elongated slot of the movable jaw and selectively positioned in one of the retaining notches, a tension spring disposed inside the holder shell and connected between the holder shell and the coupling arm, and two handles respectively fastened to the fixed jaw and the holder shell.

5 Claims, 3 Drawing Sheets

CUTTING STROKE-ADJUSTABLE PRUNING SHEARS

FIELD OF THE INVENTION

The present invention relates to pruning shears and, more particularly, to a cutting-stroke-adjustable pruning shears, which does not hook external objects when cutting, and has a neat outer looking.

BACKGROUND OF THE INVENTION

A conventional cutting stroke-adjustable pruning shears 90, as shown in FIG. 1, comprises a fixed jaw 91, a movable jaw 92 pivoted to the fixed jaw 91 for a scissors action and having an elongated slot 93 near the rear side and a plurality of retaining notches 94 arranged along one long side of the elongated slot 93, a flat swivel arm 95 having a front side pivoted to a middle part of the fixed jaw 91, a coupling arm 96 having a front part pivoted to the swivel arm 95 and a rear side fixedly mounted with a pivot, which is inserted through the elongated slot 93 and selectively positioned in one of the retaining notches 94, a tension spring 98 connected between a rear side of the swivel arm 95 and one end of the coupling arm 96, and two handles 99 respectively fastened to the rear side of the swivel arm 95 and the rear side of the fixed jaw 91. When moving handles 99 with the hands, the jaws 91 and 92 are moved relative to each other. Further, the pivot can be shifted from one of the retaining notches 94 to another to change the position of the fulcrum. This structure of pruning shears is still not satisfactory in function. The drawbacks of this structure of pruning shears are outlined hereinafter.

1. Because the tension spring 98 is exposed to the outside, it may be forced to hook external objects or to fall out of position during cutting operation of the pruning shears. Further, because the tension spring 98 is not kept from sight, it destroys the sense of beauty of the outer appearance of the pruning shears.

2. Because the coupling arm 96 has one end pivoted to one side of the swivel arm 95 and the other end pivoted to one side of the movable jaw 92, the asymmetrical connection between the coupling arm 96 and the swivel arm 95 and the asymmetrical connection between the coupling arm 96 and the movable jaw 92 are unstable.

SUMMARY OF THE INVENTION

The present invention has been accomplished to provide a cutting stroke-adjustable pruning shears, which eliminates the aforesaid drawbacks.

It is one object of the present invention to provide a cutting stroke-adjustable pruning shears, which has a neat outer looking.

It is another object of the present invention to provide a cutting stroke-adjustable pruning shears, which does not hook up with external objects during its cutting action.

It is still another object of the present invention to provide a cutting stroke-adjustable pruning shears, which has the connection between parts made symmetrical to achieve a stable scissors action.

According to the present invention, the cutting stroke-adjustable pruning shears comprises a fixed jaw and a movable jaw pivoted together, the movable jaw having an elongated slot and a plurality of retaining notches in one long side of the elongated slot. A holder shell has two parallel side panels pivoted to a middle part of the fixed jaw at two sides and a spine connected between the parallel side panels. A coupling arm has one end pivoted to the parallel side panels of the holder shell and an opposite end mounted with a pivot coupled to the elongated slot of the movable jaw and selectively positioned in one of the retaining notches. A tension spring is disposed inside the holder shell and connected between the holder shell and the coupling arm. Two handles are respectively fastened to the fixed jaw and the holder shell.

DETAILED DESCRIPTION OF THE INVENTION

Figure 1:
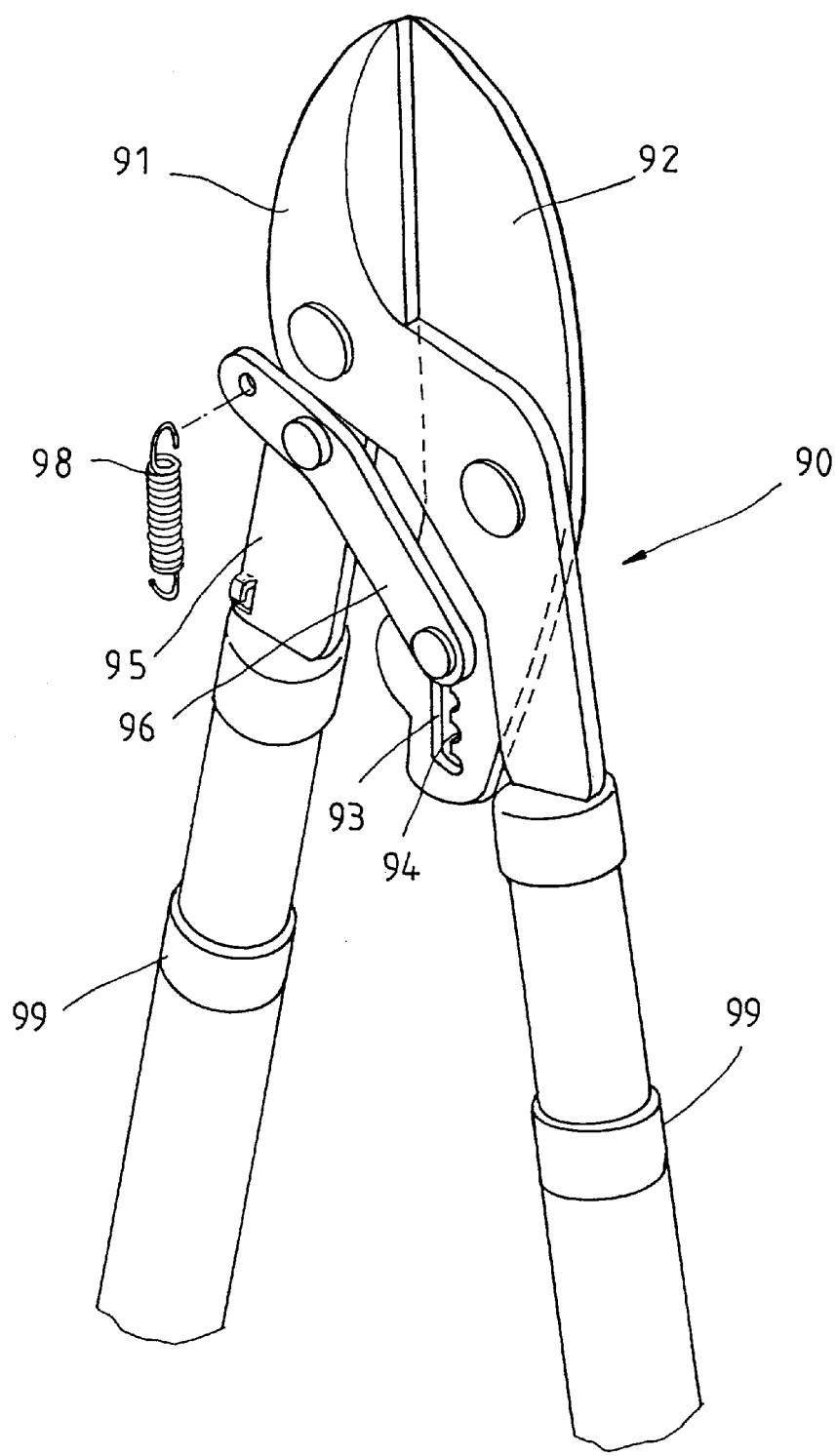
FIG. 1 is an exploded view of a cutting stroke-adjustable pruning shears according to the prior art.
Figure 2:
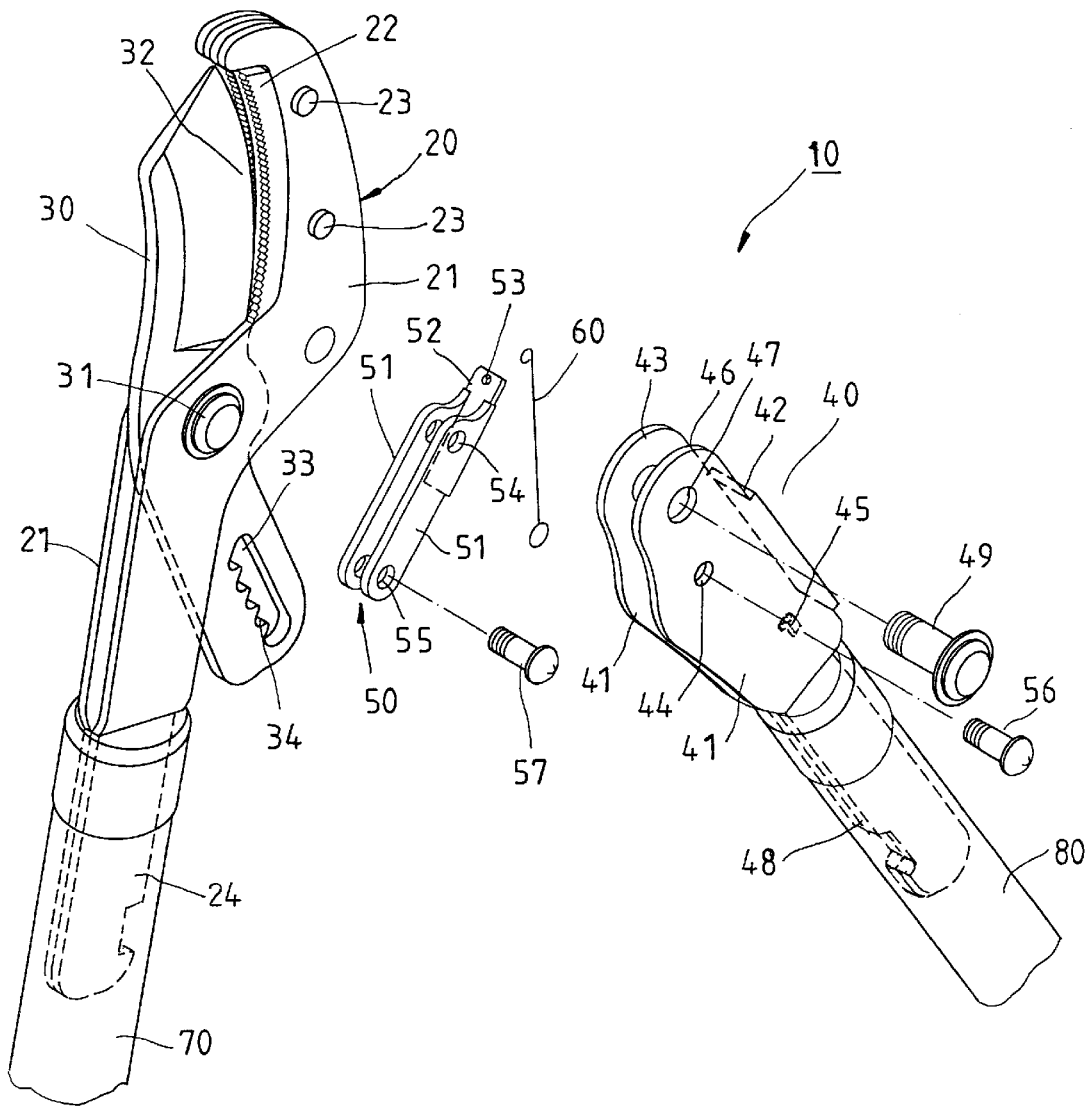
FIG. 2 is a perspective exploded view of a preferred embodiment of the present invention.

Referring to FIGS. from 2 through 4, a cutting stroke-adjustable pruning shear 10 is shown comprised of a fixed jaw 20, a movable jaw 30, a holder shell 40, a coupling arm 50, a tension spring 60, and two handles 70 and 80.

The fixed jaw 20 is comprised of two metal main plates 21 and a plastic anvil block 22. The metal main plates 21 are narrow elongated plates each having a curved middle part of substantially S-shaped profile. The shape of the anvil block 22 fits the front ends of the metal main plates 21. The anvil block 22 is fixedly mounted in between the front ends of the metal main plates 21 by rivets 23. The inner side of the anvil block 22 is serrated. The front portions of the metal main plates 21 are disposed in parallel and define a gap equal to the thickness of the anvil block 22. The rear portions of the metal main plates 21 are attached to each other, forming a plug unit 24.

The movable jaw 30 is an elongated metal plate inserted through the gap in between the metal main plates 21 of the fixed jaw 20 and pivoted with a middle part thereof to the metal main plates 21 of the fixed jaw 20 by a pivot 31 for making a scissors action with the fixed jaw 20, having a cutting edge 32 at the inner front side thereof closable to the inner side of the anvil block 22 of the fixed jaw 20, an elongated slot 33 near the rear end thereof, and a plurality of retaining notches 34 in one long side of the elongated slot 33.

The holder shell 40 is made of a metal plate by stamping, having two parallel side panels 41, and a spine 42 connected between the side panels 41 at one side and defining with the parallel side panels 41 a receiving space 43. The side panels 41 each comprise a first pivot hole 44 on the middle, a front extension lug 46, a second pivot hole 47 in the front extension lug 46, and a rear extension plug portion 48. Further, one side panel 41 has a hook 45 protruded from its inner surface near the rear side. The rear extension plug portions 48 of the side panels 41 are attached to each other. The front extension lugs 46 are respectively attached to a middle part of the fixed jaw 20 at two sides, and then pivotally secured thereto by a pivot 49, which is fastened to the second pivot holes 47 of the side panels 41 and the fixed jaw 20. The pivot point of the holder shell 40 at the fixed jaw 20 is spaced from one side of the elongated slot 33 opposite to the retaining notches 34. After connection of the holder shell 40 to the fixed jaw 20, the spine 42 is disposed at an outer side far from the fixed jaw 20.

The coupling arm 50 is made of a metal plate by stamping, comprising two parallel side wall portions 51, a connecting portion 52 connected between the side wall portions 51 and protruded over one end of each of the side wall portions 51, a hook hole 53 in the connecting portion 52, two first pivot holes 54 respectively disposed in the side wall portions 51 near one end, and two second pivot holes 55 respectively disposed in the side wall portions 51 near the other end. The connecting portion 52 of the coupling arm 50 is inserted into the receiving space 43 of the holder shell 40 and pivotally connected to the holder shell 40 by a pivot 56, which is fastened to the first pivot holes 44 of the holder shell 40 and the first pivot holes 54 of the coupling arm 50. The side wall portions 51 of the coupling arm 50 are attached to the rear end of the movable jaw 30 at two sides and pivotally connected thereto by a pivot 57, which is inserted through the elongated slot 33 of the movable jaw 30 and fastened to the second pivot holes 55 of the coupling arm 50. When installed, the pivot 57 can be moved with the coupling arm 50 in the elongated slot 33, and positioned in one of the retaining notches 34.

The tension spring 60 is mounted in the receiving space 43 of the holder shell 40 and adapted to move pivot 57 toward one end of the elongated slot 33, having one end fastened to the hook 45 of the holder shell 40 and the other end fastened to the hook hole 53 of the coupling arm 50.

The handles 70 and 80 are retractable handles respectively fastened to the plug unit 24 of the fixed jaw 20 and the plug portions 48 of the holder shell 40.

Figure 3:
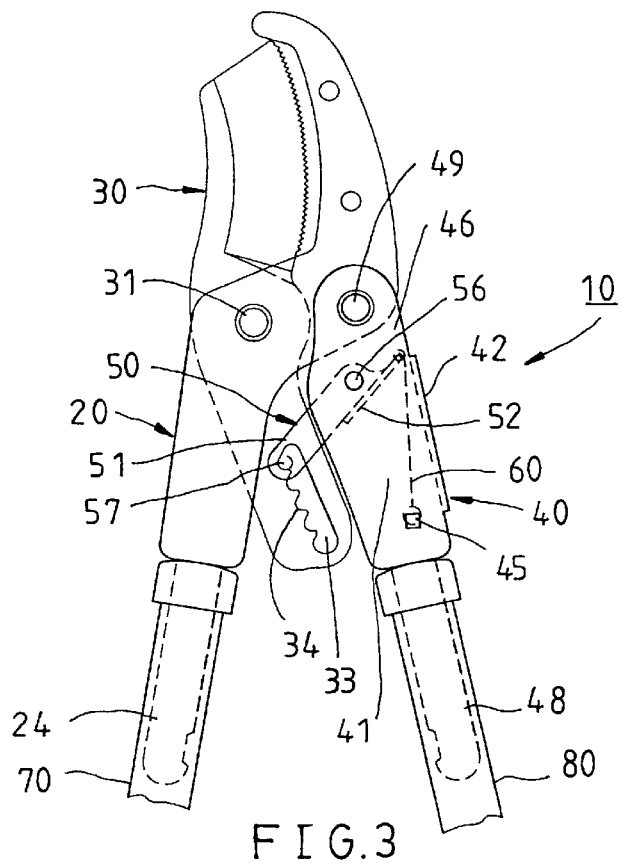
FIG. 3 is a front view (in partial) of the preferred embodiment of the present invention, showing the jaws of the pruning shears closed.
Figure 4:
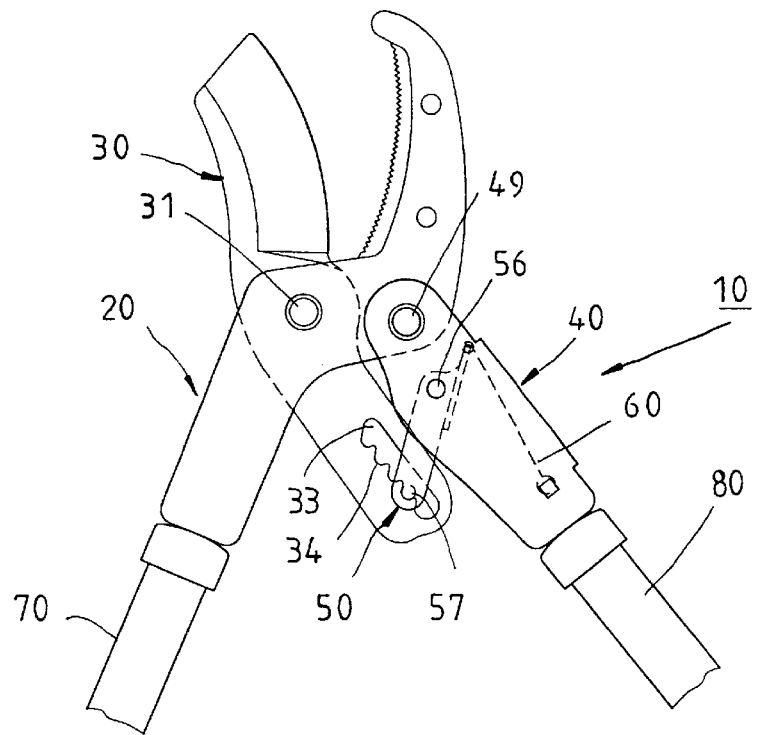
FIG. 4 is a front view (in partial) of the preferred embodiment of the present invention, showing the jaws of the pruning shears opened.

When alternatively opening and closing the handles 70 and 80 with the hands, the fixed jaw 20 and the movable jaw 30 are forced to make a scissors action. Further, the pivot 57 of the coupling arm 50 can be selectively positioned in the retaining notches 34 to change the fulcrum (see FIGS. 3 and 4), achieving different cutting strokes. The basic functioning and operational principle of the present invention are same as the conventional pruning shears. Therefore, no further detailed description on these points are necessary.

As indicated, the cutting stroke-adjustable pruning shears achieve the following advantages:

1. Because the tension spring 60 is protected in the receiving space 43 within the holder shell 40, the tension spring 60 does not fall out of place or hook on external objects during cutting operation of the pruning shears.

2. Because the two parallel side wall portions 51 of the coupling arm 50 are respectively attached to the movable jaw 30 at two opposite sides and the pivot 57 is inserted through the elongated slot 33 to pivotally secure the two parallel side wall portions 51 of the coupling arm 50 to the movable jaw 30, the connection between the coupling arm 50 and the movable jaw 30 is symmetrical and stable. Further, the connection between the coupling arm 50 and the holder shell 40 as well as the connection between the holder shell 40 and the fixed jaw 20 are symmetrical (not a single plate to single plate pivot joint as used in the prior art designs), the parts of the pruning shears are maintained in balance when receiving a force during cutting operation of the pruning shears.

3. Because the holder shell 40 keeps the tension spring 60 from sight, the pruning shears 10 is a neat and well-kept.

What is claimed is:

1. A cutting stroke-adjustable pruning shears comprising:
   a fixed jaw;
   a movable jaw having a middle part pivoted to a middle part of said fixed jaw for making a scissors action with said fixed jaw and an elongated slot near a rear side thereof, said elongated slot having a plurality of retaining notches arranged along a long side thereof;
   a holder shell having two parallel side panels and a spine connected between said parallel side panels at one side and defining with said parallel side panels a receiving space, said side panels each having a front extension lug respectively pivoted to said fixed jaw at two sides and spaced from the rear side of said movable jaw, thereby keeping said spine at an outer side relative to the rear side of said movable jaw;
   a coupling arm coupled between said holder shell and said movable jaw, said coupling arm having a first end inserted into the receiving space inside said holder shell and pivoted to the parallel side panels of said holder shell, and a second end mounted with a pivot, the pivot at the second end of said coupling arm being inserted through the elongated slot of said movable jaw and selectively positioned in one of the retaining notches of said movable jaw;
   a tension spring mounted in the receiving space of said holder shell, said tension spring having a first end fastened to a part of said holder shell remote from said front extension lugs of said parallel side panels and a second end fastened to the outmost periphery of the first end of said coupling arm; and
   two handles respectively fastened to a rear side of said fixed jaw and a rear side of said holder shell.

2. The cutting stroke-adjustable pruning shears as claimed in claim 1, wherein the side panels of said holder shell each comprise a pivot hole; said coupling arm comprises two parallel side wall portions, a connecting portion connected between said parallel side wall portions at one end, a hook hole disposed in said connecting portion and connected to the second end of said tension spring, two first pivot holes respectively disposed in said parallel side wall portions near the first end thereof and pivotally connected between the pivot holes of the side panels of said holder shell by a pivot, and two second pivot holes respectively disposed in said parallel side wall portions near the second end thereof in which the pivot at the second end of said coupling arm is installed.

3. The cutting stroke-adjustable pruning shears as claimed in claim 1, wherein the parallel side panels of said holder shell each have a rear extension plug portion attached to each other and fixedly fastened to one of said handles.

4. The cutting stroke-adjustable pruning shears as claimed in claim 1, wherein said holder shell comprises a hook inwardly protruded from one of the parallel side panels thereof for the fastening of the first end of said tension spring.

5. The cutting stroke-adjustable pruning shears as claimed in claim 1, wherein said fixed jaw is comprised of two metal main plates, and an anvil block fixedly mounted in between said metal main plates, said metal main plates each having a front portion and a rear portion, the front portions of said metal main plates being arranged in parallel and defining a gap, which receives said anvil block, the rear portions of said metal main plates being attached to each other and fixedly fastened to one of said handles.

* * * * *